(12) United States Patent
Lin et al.

(10) Patent No.: US 7,443,696 B2
(45) Date of Patent: Oct. 28, 2008

(54) RISER CARD TO SUPPORT DIFFERENT KINDS OF CONNECTORS

(75) Inventors: Jun Lin, Houston, TX (US); Thomas Duane Wright, Houston, TX (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 204 days.

(21) Appl. No.: 11/260,054

(22) Filed: Oct. 27, 2005

(65) Prior Publication Data

US 2007/0101037 A1    May 3, 2007

(51) Int. Cl.
    *H05K 1/11* (2006.01)
(52) U.S. Cl. .................................... 361/803; 361/760
(58) Field of Classification Search ............... 375/222; 710/2; 395/800, 281; 361/803, 760
    See application file for complete search history.

(56) References Cited

U.S. PATENT DOCUMENTS

| | | | |
|---|---|---|---|
| 5,421,734 A | | 6/1995 | MacWilliams |
| 5,440,755 A | * | 8/1995 | Harwer et al. ............... 710/315 |
| 5,754,796 A | * | 5/1998 | Wang et al. .................. 710/301 |
| 5,758,100 A | * | 5/1998 | Odisho ........................ 710/301 |
| 5,911,050 A | | 6/1999 | Egan et al. |
| 6,356,959 B1 | * | 3/2002 | Thomas et al. ................. 710/2 |
| 2003/0179818 A1 | * | 9/2003 | D'Angelo et al. ........... 375/222 |

* cited by examiner

*Primary Examiner*—Dean A. Reichard
*Assistant Examiner*—Andargie M Aychillhum
(74) *Attorney, Agent, or Firm*—Morris Manning Martin LLP; Tim Tingkang Xia, Esq.

(57) ABSTRACT

A connecting apparatus comprises a riser card (10) and a slot (20). The riser card comprises a PCI-X slot (13), a PCI-E slot (11), a first connector (15), a second connector (17) and a third connector (19). The first connector set a serial of PCI-X signal pads (151) on one side thereof. The second connector is adapted to provide power and ground signals. The third connector set a serial of PCI-E signal pads (191) on the same side thereof as the first connector. The slot is defined on a circuit board for the riser card inserted therein. The slot comprises a first portion (21) and a second portion (23) coupling to the second connector. The first portion comprises a first side with a series of PCI-X signal pins (211) coupling to the serial of PCI-X signal pads of the first connector, when the riser card is inserted into the slot in a first direction with the first connector inserted into the first portion. The first portion comprises a second side with a series of PCI-E signal pins (191) coupling to the serial of PCI-E signal pads of the third connector, when the riser card is inserted into the slot in a second direction which is reverse to the first direction with the third connector inserted into the second portion.

19 Claims, 4 Drawing Sheets

RISER CARD TO SUPPORT DIFFERENT KINDS OF CONNECTORS

BACKGROUND OF THE INVENTION

1. Field of the Invention

The present invention relates to a connector apparatus, and more particularly to a connector apparatus used in computer system.

2. General Background

The demands of emerging peripheral Input/Output devices exceed the capability of the traditional PCI (Peripheral Component Interconnect) bus. Technical innovations such as faster CPU front side bus speeds, faster memory speeds, high-performance graphics, faster networking devices, faster storage devices, high-speed consumer devices and other market requirements will drive the need for much greater internal system bandwidth.

So some high-speed buses are invented and used according to better signal transmission standards. For example, the PCI-X bus following PCI-X signal transmission standard is developed on the base of the PCI bus. The PCI-X bus has higher frequency and wider bus width than the PCI bus, so PCI-X bus has higher throughput. Another high speed bus that is widely used is PCI Express (PCI-E) bus following PCI-E signal transmission standard. PCI-E establishes a point-to-point connection from chip to chip, or chip to adapter on motherboard. This full-duplex, dedicated, scalable lane bus increases bandwidth, decreases latency, and allows devices to perform as they were meant to. A single lane (X1) of PCI-E has a bandwidth of 250 MB/sec. By running multiple lanes, (up to X32), the bandwidth increases arithmetically.

Users often hope to define more high-speed connectors in the motherboard to support peripheral devices. But the scale of the motherboard is limited, there is not enough space to set enough high speed connectors on the motherboard.

What is needed, therefore, is a connector apparatus of a connection system, such as a riser card and a riser card slot that can be used to transfer different kinds of signals, such as PCI-E signals and PCI-X signals, to corresponding cards.

SUMMARY

A connecting apparatus of a connection system comprises a riser card as a first component thereof and a slot as a second component thereof. The riser card comprises a PCI-X slot, a PCI-E slot, a first connector, a second connector and a third connector. The first connector set a serial of PCI-X signal pads on one side thereof. The second connector is adapted to provide power and ground signals. The third connector set a serial of PCI-E signal pads on the same side thereof as the first connector. The slot is defined on a circuit board for the riser card inserted therein. The slot comprises a first portion and a second portion coupling to the second connector. The first portion comprises a first side with a series of PCI-X signal pins coupling to the serial of PCI-X signal pads of the first connector, when the riser card is inserted into the slot in a first direction with the first connector inserted into the first portion. The first portion comprises a second side with a series of PCI-E signal pins coupling to the serial of PCI-E signal pads of the third connector, when the riser card is inserted into the slot in a second direction which is reverse to the first direction with the third connector inserted into the second portion.

Other objects, advantages and novel features of the invention will become more apparent from the following detailed description when taken in conjunction with the accompanying drawings, in which:

DETAILED DESCRIPTION OF THE EMBODIMENTS

Figure 1:
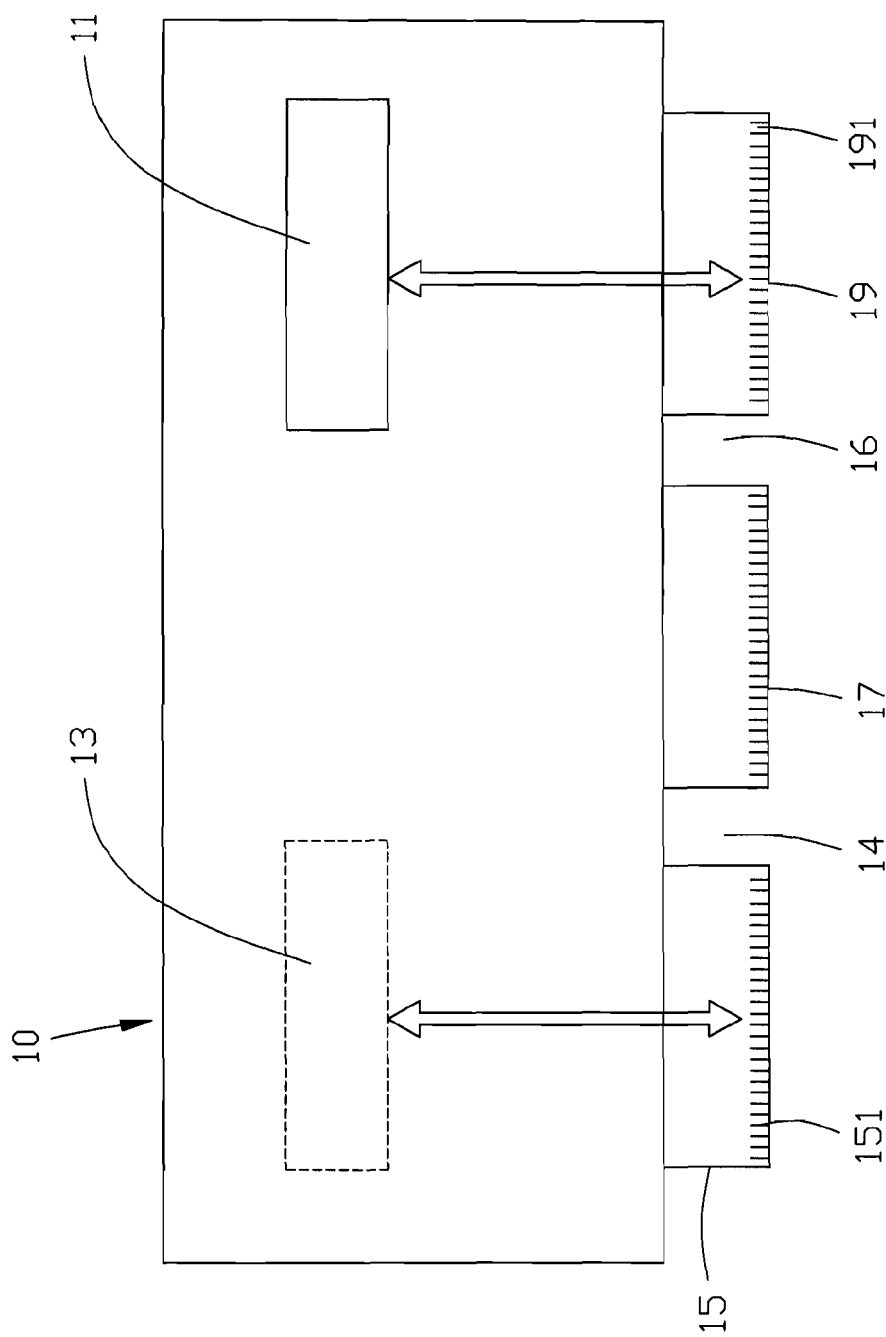
FIG. 1 is a front elevational view of a riser card of a preferred embodiment of the present invention.
Figure 2:
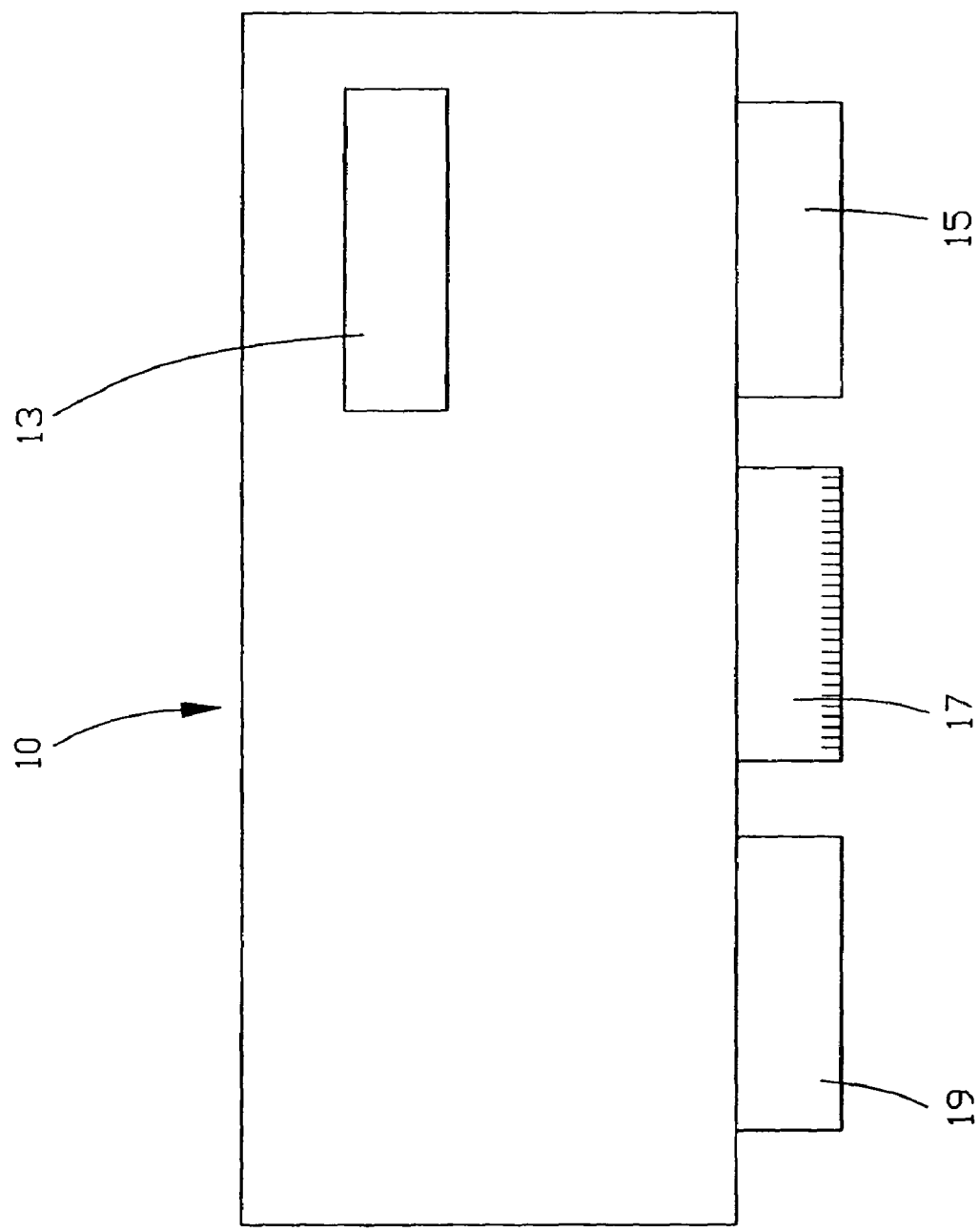
FIG. 2 is a back elevational of the riser card of FIG. 1.
Figure 3:
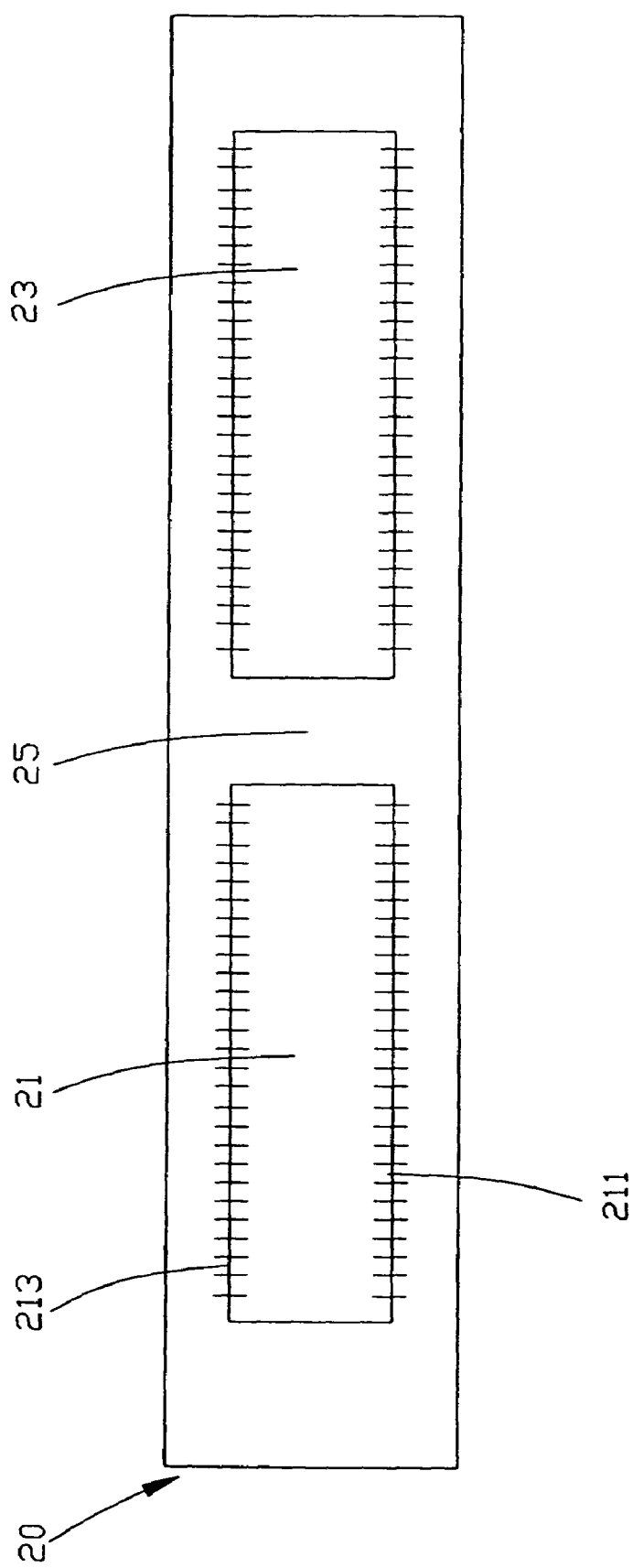
FIG. 3 is a top plan view of a riser card slot corresponding to the riser card.

Referring to FIGS. 1, 2 and 3, a connecting apparatus of a connection system in accordance with a preferred embodiment of the present invention includes a riser card 10 as a first component thereof and a riser card slot 20 as a second component thereof. The riser card 10 includes a standard PCI-E slot 11, a standard PCI-X slot 13, a first connectors 15, a second connector 17 and a third connector 19. The second connector 17 is adapted to provide power and ground signals. The PCI-E slot 11 is defined on an A-side of the riser card 10 corresponding to the third connector 19. The PCI-X slot 13 is defined on a B-side of the riser card 10 adjacent the first connector 15. A notch 14 is defined between the first connector 15 and the second connector 17. A notch 16 is defined between the second connector 17 and the third connector 19.

Referring to FIG. 1, the A-side of the riser card 10 is shown. A series of PCI-X signal pads 151 are set on an A-side of the first connector 15. The PCI-X signal pads 151 connect to the PCI-X slot 13 defined in the riser card 10. A series of PCI-E signal pads 191 are set on an A-side of the third connector 19. The PCI-E signal pads 191 connect to the PCI-E slot 11 defined in the riser card 10.

Referring to FIG. 2, the B-side of the riser card 10 is shown. B-sides of the first connector 15 and third connector 19 are blank. For an alteration, some power and ground pads can be set on the B-sides of the first connector 15 and third connector 19.

Referring to FIG. 3, the slot 20 is defined in a circuit board for the riser card 10 inserted therein. The slot 20 includes a first portion 21, a second portion 23 and a key 25 formed between the first portion 21 and second portion 23. A series of PCI-X signal pins 211 corresponding to the PCI-X signal pads 151 are set along one side of the first portion 21. A series of PCI-E signal pins 213 corresponding to the PCI-E signal pads 191 are set along the other side of the first portion 21. The second portion 23 is adapted to provide power and ground signals corresponding to the second connector 17.

Figure 4:
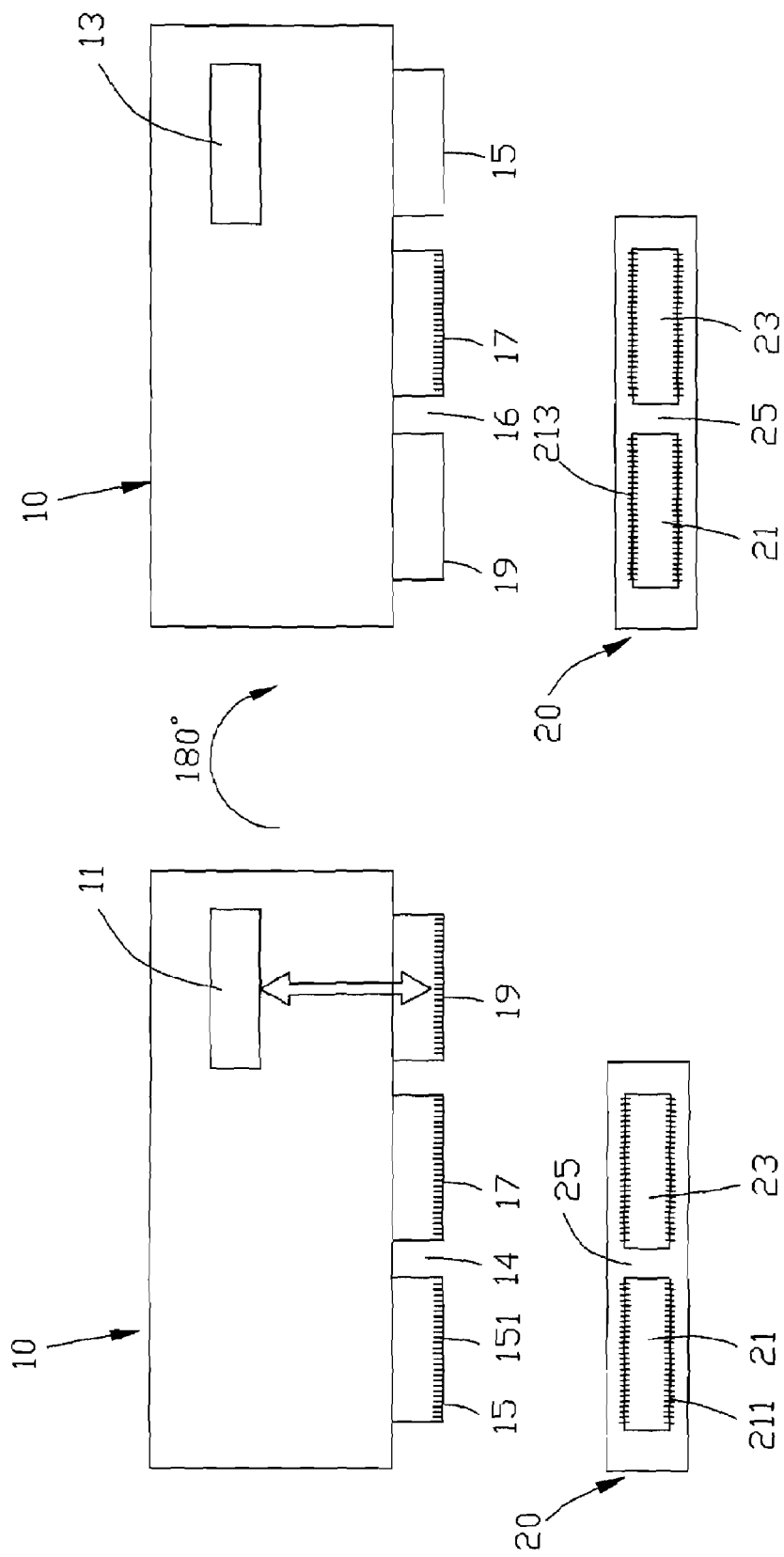
FIG. 4 is a sketch picture of the riser card pre-inserted in the slot in two different orientation.

Referring to FIG. 4, the riser card 10 is pre-inserted into the slot 20 with the first connector 15 and the second connector 17 inserted into the first portion 21 and the second portion 23 respectively. The key 25 of the slot 20 is received in the notch 14 of the riser card 10. The PCI-X signal pads 151 of the first connector 15 is coupled with the PCI-X signal pins 211 of the first portion 21. So the PCI-X slot 13 of the riser card 10 can be used to insert a PCI-X card therein.

Then, the riser card 10 is reversed to be inserted into the slot 20 with the third connector 19 and the second connector 17 inserted into the first portion 21 and the second portion 23 respectively. The key 25 of the slot 20 is received in the notch 16 of the riser card 10. The PCI-E signal pads 191 of the first connector 19 is coupled with the PCI-E signal pins 213 of the first portion 21. So the PCI-E slot 11 of the riser card 10 can be used to insert a PCI-E card therein.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A connecting apparatus comprising:
    a riser card comprising:
    a first slot adapted to have a first card inserted therein;
    a second slot adapted to have a second card, which is different from the first card, inserted therein;
    a first connector connecting to the first slot, with a serial of first signal pads set on one side thereof, the other side of the first connector being blank; and
    a third connector connecting to the second slot, with a serial of second signal pads set on the same side thereof as the first connector, the other side of the second connector being blank; and
    a slot defined on a circuit board for the riser card inserted therein, the slot comprising a first portion, a series of first signal pins corresponding to the serial of first signal pads set along one side of the first portion, a series of second signal pins corresponding to the serial of second signal pads set along the other side of the first portion.

2. The connecting apparatus as described in claim 1, wherein the riser card comprises a second connector adapted to provide power and ground signals, and the slot comprises a second portion adapted to provide power and ground signals corresponding to the second connector.

3. The connecting apparatus as described in claim 1, wherein the first slot is a PCI-X slot, and the first signals pads and pins are PCI-X signals pads and pins.

4. The connecting apparatus as described in claim 1, wherein the first slot is defined on one side of the riser card, and the second slot is defined on the other side of the riser card.

5. The connecting apparatus as described in claim 1, wherein the first slot is defined adjacent the first connector, and the second slot is defined adjacent the third connector.

6. The connecting apparatus as described in claim 1, wherein the riser card is inserted in the slot in a first direction with the first connector inserted into the first portion to couple the first signal pads with the first signals pins.

7. The connecting apparatus as described in claim 2, wherein the second connector is positioned between the first connector and the third connector.

8. The connecting apparatus as described in claim 6, wherein the riser card is inserted in the slot in a second direction with the third connector inserted into the first portion to couple the second signal pads with the second signals pins.

9. The connecting apparatus as described in claim 7, wherein one notch is defined between the first connector and the second connector, and another notch is defined between the second connector and the third connector.

10. The connecting apparatus as described in claim 9, wherein the slot comprises a key formed between the first portion and the second portion of the slot.

11. The connecting apparatus as described in claim 9, wherein the second slot is a PCI-E slot, and the second signals pads and pins are PCI-E signals pads and pins.

12. A connection system comprising:
    a first component capable of generating at least two kinds of signals compatible with at least two different signal transmission standards respectively; and
    a second component capable of establishing electrical connection with said first component so as to respectively transmit said at least two kinds of signals therebetween, a portion of said second component adapted to be capable of mechanically connecting with said first component along two sides thereof, each side of said portion of said second component adapted for transmitting one of said at least two kinds of signals, one side of said portion of said second component adapted to establish said electrical connection with said first component while the other side of said portion of said second component does not electrically connect with said first component for exclusively transmitting one of said at least two kinds of signals compatible with one of said at least two different signal transmission standards, and the other side of said portion of said second component adapted to establish said electrical connection with said first component while the side of said portion of said second component does not electrically connect with said first component for exclusively transmitting another of said at least two kinds of signals compatible with another of said at least two different signal transmission standards.

13. The connection system as described in claim 12, wherein said portion has a slot therein to partially receive said first component, and said side and said other side are located beside said slot opposite to each other.

14. The connection system as described in claim 12, wherein a first connector and a second connector next to said first connector extend respectively from said first component, said first connector is mechanically and electrically connectable with said side of said portion of said second component so as to transmit exclusively said one of said at least two kinds of signals compatible with said one of said at least two different signal transmission standards between said first and second components, and said second connector is mechanically and electrically connectable with said other side of said portion of said second component so as to transmit exclusively said another of said at least two kinds of signals compatible with said another of said at least two different signal transmission standards between said first and second components.

15. The connection system as described in claim 12, wherein common signals identifiable from said at least two different signal transmission standards respectively are transmissible through another portion of said second component mechanically connectable with said first component.

16. A connection system comprising:
    a first component capable of generating at least two kinds of signals compatible with at least two different signal transmission standards respectively, a first connector extending from said first component adapted to transmit one of said at least two kinds of signals compatible with one of said at least two different signal transmission standards, and a second connector extending from said first component next to said first connector and adapted to transmit another of said at least two kinds of signals compatible with another of said at least two different signal transmission standards; and
    a second component capable of establishing electrical connection with said first component so as to transmit said at least two kinds of signals therebetween, a portion of said second component adapted to be mechanically connectable with said first connector of said first component along a first orientation of said first component relative to said second component so as to transmit said one of said at least two kinds of signals between said first and second components and not transmit said another of said at least two kinds of signals between said first and second components, and connectable with said second connector of said first component along a second orientation of said first component relative to said second component so as to transmit said another of said at least two kinds of signals between said first and second components and not transmit said one of said at least two kinds of signals between said first and second components.

17. The connection system as described in claim 16, wherein said first component is a riser card capable of performing signal transmission compatible with Peripheral Component Interconnect Extension (PCI-X) standard and Peripheral Component Interconnect Express (PCI-E) standard respectively, and said second component is a slot capable of mechanically connecting with said riser card to perform said signal transmission.

18. The connection system as described in claim 16, wherein said first orientation of said first component relative to said second component is reverse to said second orientation of said first component relative to said second component.

19. The connection system as described in claim 16, wherein a third connector is formed between said first and second connectors from said first component, and said second component has another portion corresponding to said third connector and adapted to mechanically connect with said third connector in both situations when said first component is electrically connected with said second component along said first orientation thereof and when said first component is electrically connected with said second component along said second orientation thereof.

* * * * *